Oct. 15, 1968   M. ALIMANESTIANU   3,405,817
WAREHOUSE FACILITY

Filed Feb. 1, 1966   4 Sheets-Sheet 1

INVENTOR.
Mihai Alimanestianu
BY
ATTORNEY

Oct. 15, 1968   M. ALIMANESTIANU   3,405,817
WAREHOUSE FACILITY

Filed Feb. 1, 1966   4 Sheets-Sheet 4

United States Patent Office 3,405,817
Patented Oct. 15, 1968

3,405,817
WAREHOUSE FACILITY
Mihai Alimanestianu, Nyack, N.Y., assignor to Speed-Park, Inc., New York, N.Y., a corporation of New York
Filed Feb. 1, 1966, Ser. No. 524,151
6 Claims. (Cl. 214—16.1)

ABSTRACT OF THE DISCLOSURE

A warehouse facility for storing and retrieving items having tiers of stalls with passageways between the tiers of stalls and transfer means moving in the passageways, together with conveyors related to the transfer means for bringing items to the transfer means and for removing items from the transfer means, the conveyors having a construction particularly cooperative with elements of the transfer means.

---

The warehousing of large numbers of given items having individually differing characteristics, for selective withdrawal of particular items for delivery from the warehouse normally involves excessive handling procedures at incoming and outgoing intervals. With conventional handling of the items, incoming and outgoing movements are slow, inefficient and highly susceptible to damage of the items being warehoused.

Typically, newly manufactured automobiles are warehoused simply on open air parking lots of enormous acreage to accommodate the large numbers of vehicles which differ individually as to style, color, etc. To withdraw a particular vehicle from its storage position and to move the same to a given delivery station, requires manual handling of the vehicle under conditions conducive to slow movements and possible damage. Storaged items other than motor vehicles are equally susceptible to damage and mistreatment with conventional warehouse handling procedures, both incoming and outgoing; as well as relatively expensive handling costs chargeable to each item so warehoused.

Accordingly, an object of this invention is to provide an improved warehouse facility for sorting and storing incoming items, such as motor vehicles or the like, which items are individually stored in manner to permit automatic storage and retrieval of selected items; including conveyors and transfer means effective to handle the incoming items and to transfer the outgoing items to selected delivery stations respectively suited for a particularly delivery means such as trucks, railroad cars and the like.

Another object of this invention is to provide an improved storage facility of the multilevel stall type for holding individual items to be stored in separate stalls, together with automatically operated transfer means operative as input means for transferring incoming items to their respective storage stalls, and automatically operated transfer means operative as output means for transferring items from their storage stalls to one of a plurality of delivery stations, each delivery station being correlated to a particular form of delivery means.

A further object of this invention is to provide in a warehouse facility of the stall type having transfer means for moving items into and out of selected stalls; incoming and outgoing conveyor means for carrying items to and from the transfer means, wherein the conveyor means includes means to correlate the operation of such conveyor means with the operation of the transfer means.

Still another object of this invention is to provide a warehouse facility of the character described, which comprises multilevel rows of stalls coordinated with a longitudinally moving elevator carrying transfer means for moving items into and out of selected stalls, together with conveyor means arranged to bring items into the facility for transfer to the transfer means, and conveyor means arranged to receive items from the transfer means for movement to selected delivery stations for ultimate transfer of the items to delivery means including trucks, railroad cars and the like.

Yet a further object of this invention is to provide a warehouse facility for storing a large number of items yet occupying a minimum site area, and including automatically operated transfer means for moving items into and out of storage portions of the facility at a high rate of speed and without manual handling to materially reduce handling costs and damage to the handled items.

Other objects of this invention will in part be obvious and in part hereinafter pointed out.

Essentially the warehouse facility of the instant invention comprises a multistory structure having multilevel rows of storage stalls for respectively receiving and storing particular items. The rows of stalls open on a transfer passageway which runs the length of the structure and in which moves an elevator carrying the transfer mechanism whereby such mechanism may be aligned with a selected stall in a selected vertical column and at a selected level, to effect a transferring operation of the item between the elevator and the stall.

Further, said facility includes conveyor means for bringing the items to be stored in the facility from an input station such as a manufacturing or delivery facility to the elevator structure for transfer to the transfer mechanism thereof; and further conveyor means cooperative with the transfer mechanism for receiving items removed from a storage stall to move the item to delivery stations where the item is again transferred to trucks, railroad cars or the like.

Figure 1:
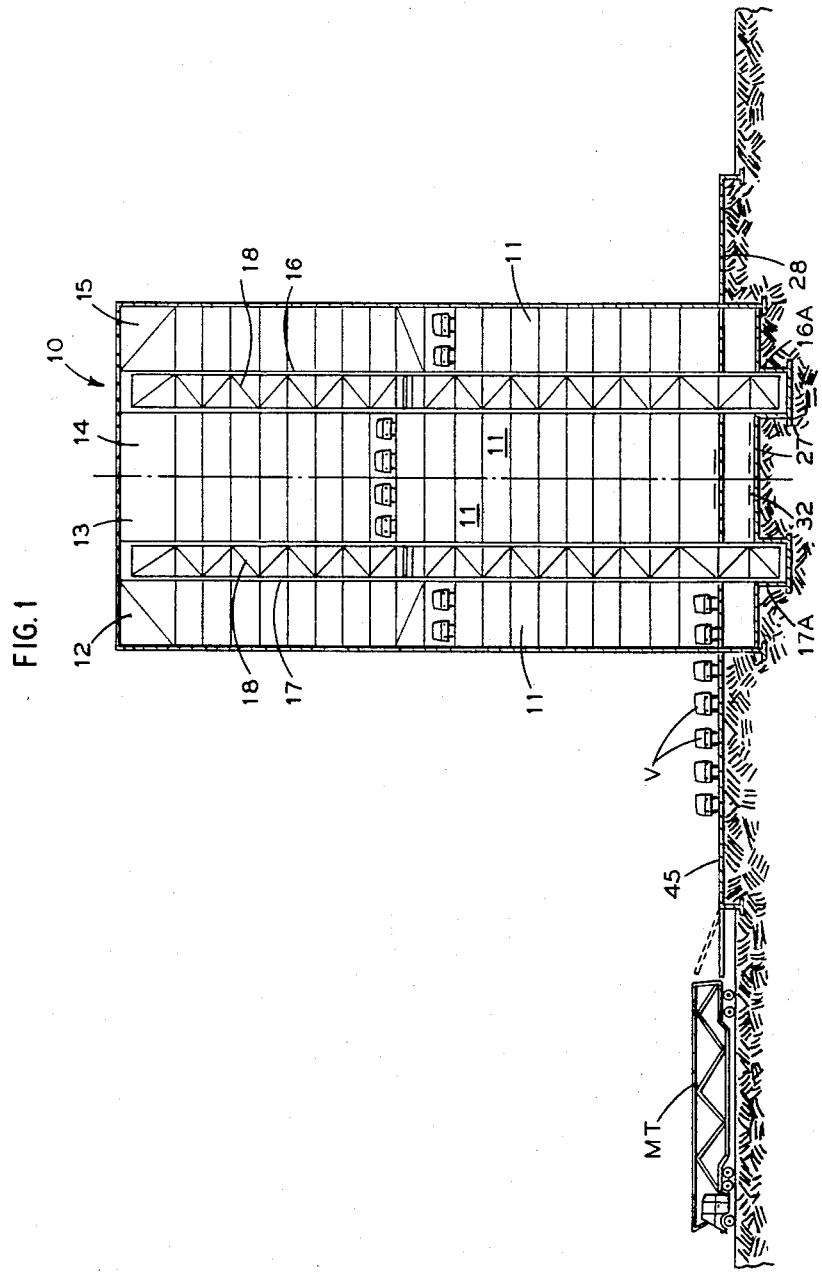
FIG. 1 is a vertical, transverse sectional view of a warehouse facility embodying the invention.

Thus, as shown in FIG. 1, 10 designates a warehouse facility embodying the invention. The same comprises columns of stalls 11. For the purpose of illustration, stalls 11 are shown as longitudinally extending rows, four in number and indicated at 12, 13, 14 and 15. Stall rows 12 and 13 are separated by a longitudinally extending transfer passageway 16 while stall rows 14 and 15 are separated by a similar passageway 17. The stalls 11 of rows 12, 13 open on passageway 16 while the stalls 11 of rows 14, 15 open on passageway 17.

Transfer means is provided in each of the passageways 16, 17. To this end there is provided upstanding elevator structures indicated at 18, 19 which are arranged to move longitudinally in passageways 16, 17 so as to align themselves with a selected column of stalls 11. The details of such an elevator structure are found in Patents 2,915,204 and 3,063,579. Essentially, such elevator structures 18, 19 move on rails located in pit portions 16A, 17A of passageways 16, 17 so as to traverse facility 10 from one end thereof to the other end thereof.

The elevators 18, 19 carry transfer mechanisms which include pickup and transfer portions arranged to be projected from either side of the elevators, into stalls on either side of the passageways 16, 17 for the purpose of transferring items for storage in the stalls, or contra, to remove a stored item from a stall. The details of such transfer mechanisms, as well as details of the stalls cooperative with such mechanisms, are also shown in said Patents 2,915,204 and 3,063,579.

Figure 6:
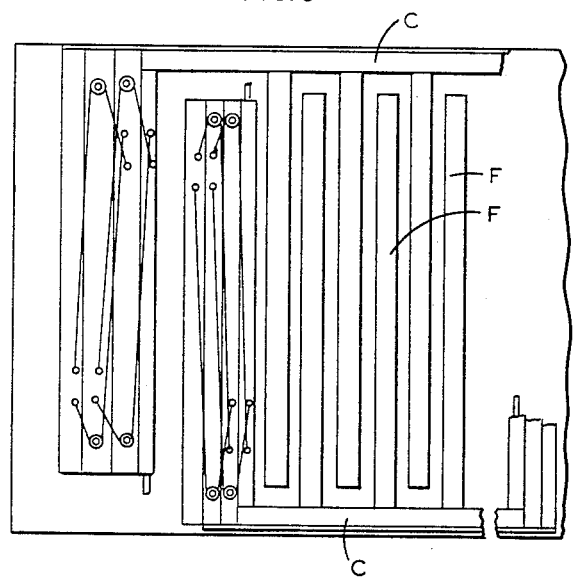
FIG. 6 is a plan view showing a portion of the transfer mechanism.

Essentially, the transfer mechanisms of said Patents 2,915,204 and 3,063,579 comprise a pair of comblike members C having their fingers F arranged in interdigitating relation, see FIG. 6. As detailed in said patents, members C are arranged for vertically displaced movement and projected and retracted horizontal movements so as to transfer a given item carried on fingers F between the elevators 18, 19 and stalls 11.

Figure 2:
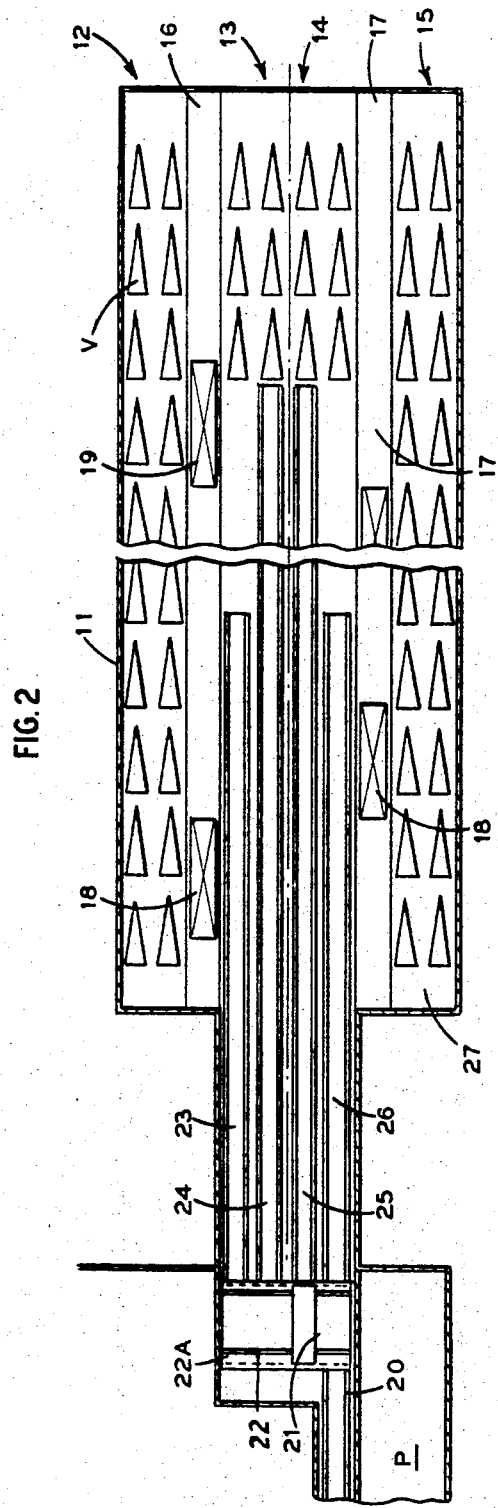
FIG. 2 is a plan view thereof showing the level at which items are brought into the facility.
Figure 3:
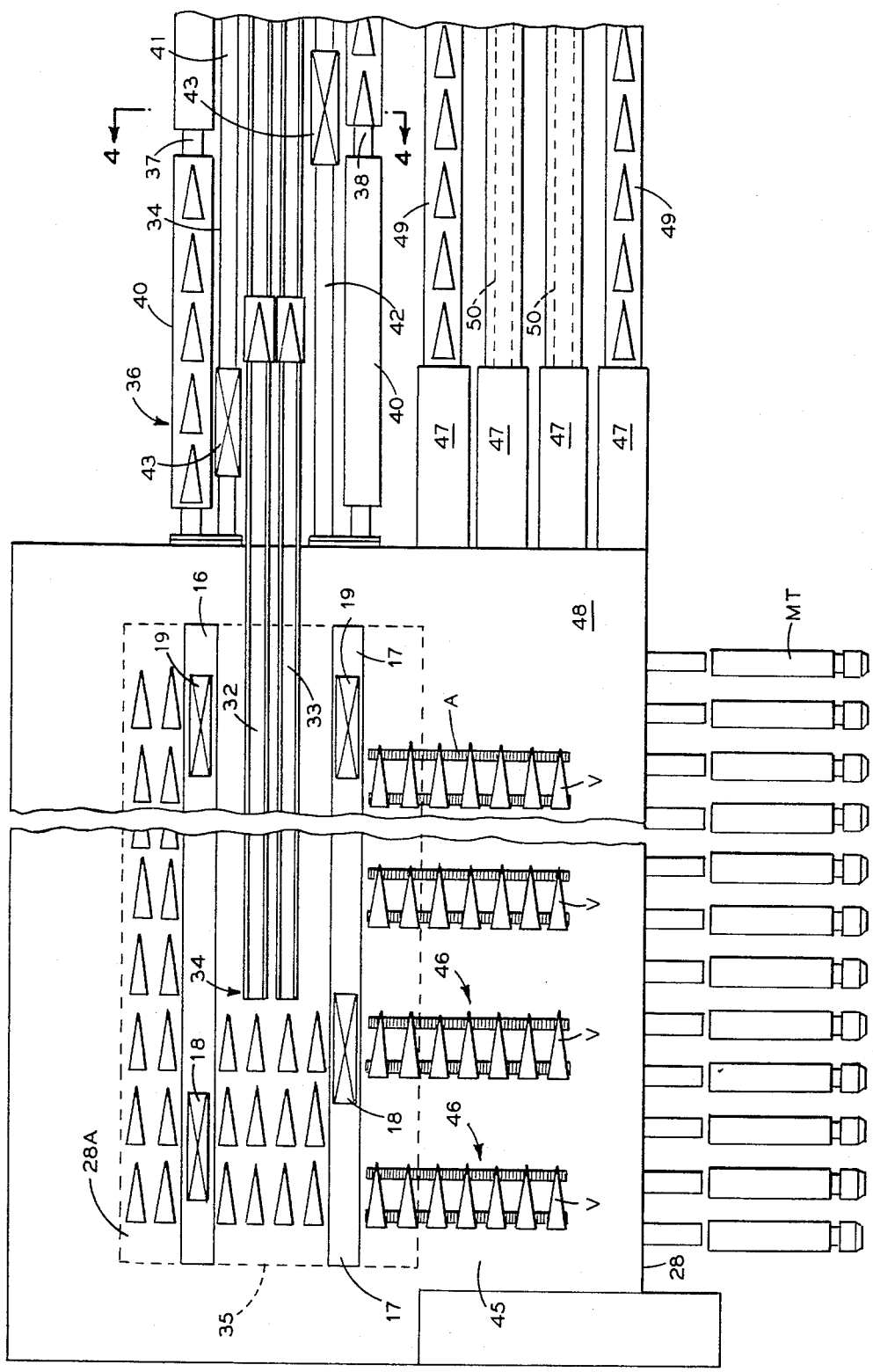
FIG. 3 is a plan view thereof showing the level at which items are moved out of the facility.
Figure 4:
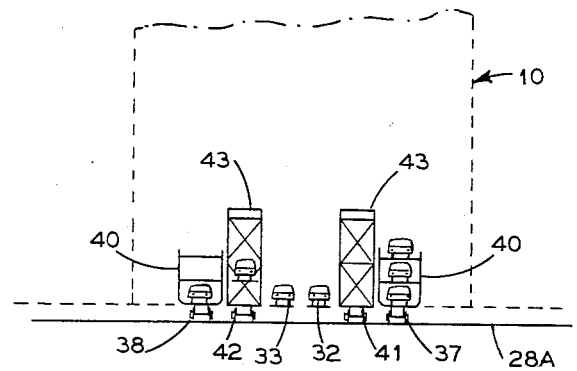
FIG. 4 is a vertical, transverse sectional view taken on the line 4—4 of FIG. 3.
Figure 5:
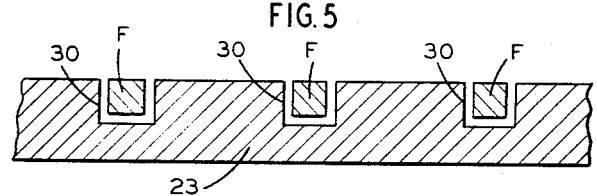
FIG. 5 is a partial transverse sectional view showing a detail of the endless conveyor means.

For the purpose of illustration, warehouse facility 10 is shown for storage of motor vehicles indicated at V. As shown in FIGS. 1–3, the stalls 11 are of a size and disposition to locate two vehicles V in side by side relation in each stall. This arrangement is detailed particularly in Patent 3,063,579, and the details of the transfer mechanism adapted for such arrangement of vehicles, is also set forth in said patent. However, it is understood that the stalls may be adapted to receive a single vehicle V, in which case the stall arrangement and transfer mechanism of Patent 2,915,204 would be particularly appropriate.

While elevator structures 18, 19 move in the same transfer passageways 16, 17, the length of structure 10 suggests the operation of each elevator structure for one half the length of the structure, to facilitate incoming and outgoing movements. Obviously, for structures of shorter length, a single elevator structure may be used in each passageway. It is understood that the number of transfer passageways is dictated by the overall number of stalls, structure height, and the like.

Assuming that vehicles V are assembled in a plant generally indicated at P and that warehouse facility 10 is located adjacent plant P, then the vehicles V are delivered by a conventional assembly line endless conveyor 20 to a separating station 21 where a conventional transfer device comprising a relatively short endless conveyor 22 is mounted on a carriage 22A moving transversely of the path of conveyor 20 to align conveyor 22 with one of a group of longitudinally extending endless conveyors 23, 24, 25 and 26.

Suitably, conveyors 23–26 move on a horizontal level 27 which is depressed below the normal grade level 28 of structure 10. The outermost conveyors 23, 26 of restricted longitudinal extent are adapted to service the rearmost elevator structures 18, while the inner conveyors 24, 25 of greater longitudinal extent are adapted to service the foremost elevator structures 19, see FIG. 2.

Thus, the vehicles V carried on conveyors 23, 26 may be laterally aligned with elevator structures 18; the movement of the conveyors being momentarily halted, so that the transfer mechanisms in said elevators 18 may be operated to project comblike members C thereof into operative relation with conveyors 23 or 26. To this end, conveyors 23, 26 may have their upper surfaces formed with parallel, transversely extending grooves 30 which will receive the fingers F of transfer member C, FIG. 6, thereby allowing the vehicle V carried by conveyors 23, 26 to be transferred to elevators 18.

Accordingly, the output of plant P may be stored in stalls 11 of facility 10, through suitably controlled operation of conveyor 20, transfer device 21, conveyors 23–26 and elevators 18, 19. At the incoming level 27, stalls 11 are located outwardly of transfer passageways 16, 17 throughout the entire longitudinal extent of facility 10, and to a limited extent inwardly of said passageways, between the terminal end of conveyors 24, 25 and the forward end of facility 10, see FIG. 2.

Means is provided for effecting removal of stored vehicles V from their stalls 11, as desired, for transfer to various forms of delivery stations or points. Thus, vehicles V may be transferred to railroad freight cars, particularly those of the trilevel type adapted to receive motor vehicles; or may be transferred to a loading apron for loading on motor trucks.

Thus, a pair of parallel, endless conveyors 32, 33 are located at a horizontal level 28A coextensive with grade level 28 and immediately above conveyors 23–26. Conveyors 32, 33 are also disposed between transfer passageways 16, 17 and extend longitudinally from a point 34 near the back end 35 of the facility through the length of the facility and outwardly thereof to a railroad car loading station generally indicated at 36.

Conveyors 32, 33 are also formed with transverse grooves 30 so as to render the same cooperative with the transfer mechanism C of elevators 18, 19 as previously described. Thus, elevators 18, 19 may be operated in passageways 16, 17 to bring the same into operative relation to a selected stall 11 whereby a vehicle V may be removed from its stall 11 by suitable operation of the transfer mechanism to project and then retract comblike member C, as set forth in detail in Patents 2,915,204 and 3,063,579, and thereafter said vehicle V is transferred to conveyor 32 or 33 at level 28A, the conveyor 32 or 33 having been halted for the purpose.

At railroad car loading station 36 there is provided parallel sets of railroad tracks 37, 38 respectively located outwardly of conveyors 32, 33, upon which railroad cars 40 of the multilevel, side loading type are disposed. Between tracks 37, 38 and conveyors 32, 33, there are provided longitudinally extending track sections 41, 42 upon which move loaders 43. Loaders 43 in effect are miniature elevators and transfer mechanisms, similar to elevators 18, 19; except that they have limited vertical movement, sufficient to align the transfer mechanisms C thereof with the three levels of railroad cars 40.

Thus, loaders 43 are indexed as to position with conveyors 32, 33 to effect transfer of vehicles V from said conveyors to said loaders; and in turn, loaders 43 are then indexed as to position with railroad cars 40 so as to transfer the vehicle V from the loaders to the cars; said cars being adapted to cooperate as to floor structure at the several levels thereof with the fingers F of the transfer mechanism C, in a manner similar to that set forth in Patents 2,915,204 and 3,063,759.

Additionally, a loading station is provided for loading vehicles V on motor trucks MT. To this end, there is provided a loading apron 45 coextensive with grade level 28 which extends longitudinally along one side of facility 10. On such apron 45 there is provided a series of endless conveyors 46 which move in paths at right angles to transfer passageway 17 and substantially abut at their inner ends in said passageway.

Thus, elevators 18, 19 in passageway 17 may be used to remove vehicles V from stalls 11 and then brought into alignment with a selected conveyor 46; the transfer mechanism on the elevator then being operated to transfer the vehicle to said conveyor 46. Again, conveyors 46 are structurally formed to receive the fingers F of the transfer mechanism C to effect an efficient transfer operation.

The vehicles V are then driven off the far end of conveyors 46 over the foreportion of apron 45 to be end loaded in the usual manner on motor trucks MT. As indicated in FIG. 3, the facility 10 is open along the path immediately adjacent transfer passageway 17, on the level 28A to allow the rear portions of conveyors 46 to project inwardly of the side of said facility 10.

Additionally, apron 45 provides means for moving vehicles V from conveyors 46 to ramps 47 extending longitudinally from the forward end 48 thereof, for end loading in railroad cars 49 adapted for usual end loading, which are disposed on tracks 50 running parallel to track 38.

It will be apparent that the warehouse facility herein disclosed lends itself to a highly efficient storage and shipping arrangement wherein incoming and outgoing items are effectively storaged and transferred from storage to any one of several delivery operations, making the facility highly flexible in use. Since, the operation of the various conveyors and transfer mechanisms lend themselves to automatic operation; the various movements of items to be stored and delivered at selected stations may be made in a rapid, cost saving manner; minimizing manual handling of the items and in many cases, eliminating manual handling with consequent reduction in damages incident to handling.

It is understood that if necessary, movement of vehicles between successive conveyors may be facilitated by the use of conventional pusher devices, well known in the art; particularly when bridging the gap between successive endless conveyors.

When the facility 10 is shown as particularly adapted for warehousing vehicles, it is understood that other items may be handled in a similar manner.

As various changes may be made in the disclosed embodiment of the invention without departing from the spirit thereof, it is understood that all matter herein shown or described shall be deemed illustrative and not by way of limitation except as set forth in the appended claims.

What is claimed is:

1. In a warehouse facility comprising a plurality of multilevel rows of stalls for receiving items to be stored in the respective stalls, a transfer passageway extending longitudinally between opposed rows of stalls, the stalls of each of said rows opening on said passageway, transfer means movable in said passageway, said transfer means including elevator means and transfer mechanism on said elevator means whereby said transfer mechanism may be laterally aligned with a selected stall upon longitudinal movement of said transfer means in said passageway and vertical movement of said elevator means on said transfer means to the level of said selected stall, said transfer mechanism including a first and second set of item carrying finger means mounted in interfingering relation and movable laterally relative to each other into and out of a selected stall to permit an item to be transferred between said selected stall and said transfer means, conveyor means for carrying items to be storaged in said facility, said conveyor means moving in a path parallel to said transfer passageway and adjacent thereto, said conveyor means including groove means for receiving the item carrying finger means of said transfer mechanism to allow items carried on said conveyor means to be transferred to said transfer means, a plurality of second conveyor means adjacent one side of said transfer passageway adapted to receive items from said item carrying means of said transfer means removed from a selected stall by said transfer means for movement to an outgoing station of said facility, said out-going station comprising a loading apron.

2. A warehouse facility as in claim 1 wherein said second conveyor means moves in a path parallel to said transfer passageway, and said first and second conveyor means being located at different horizontal levels.

3. A warehouse facility as in claim 1 wherein said second conveyor means moves in a path at an angle to the direction of said transfer passageway.

4. A warehouse facility as in claim 1 wherein said second conveyor means moves in a path parallel to said transfer passageway, second transfer means movable longitudinally in a path parallel to and adjacent the path of said second conveyor means, said second transfer means including item carrying means movable laterally thereof, said second conveyor means and said last mentioned item carrying means having cooperative means for transferring items from said second conveyor means to said last mentioned item carrying means for movement to an outgoing station of said facility.

5. A warehouse facility as in claim 1 and including a pair of parallel transfer passageways, a row of multilevel stalls located and opening on each side of each of said transfer passageways, transfer means in each of said passageways, and each of said conveyor means moving in paths parallel to and between said passageways.

6. A warehouse facility as in claim 1 wherein said outgoing station comprises a loading apron at a given horizontal level, said first conveyor means being located on a horizontal level beneath said given horizontal level, said second conveyor means being located on said given horizontal level, said first and second conveyor means being in vertical alignment.

References Cited

UNITED STATES PATENTS

| 2,096,958 | 10/1937 | Clerc | 214—16.4 |
| 2,691,448 | 10/1954 | Lontz | 214—16.1 |
| 2,974,803 | 3/1961 | Humphrey | 214—16.4 |
| 2,988,237 | 6/1961 | Devol | 214—16.4 |
| 3,033,392 | 5/1962 | Baumann et al. | 214—16.4 |
| 3,049,247 | 8/1962 | Lemelson | 214—16.4 |
| 3,076,566 | 2/1963 | Dennis | 214—16.4 |

FOREIGN PATENTS

| 903,439 | 8/1962 | Great Britain. |

HUGO O. SCHULZ, *Primary Examiner.*

R. B. JOHNSON, *Assistant Examiner.*